(12) United States Patent
Hosokawa

(10) Patent No.: US 11,652,418 B2
(45) Date of Patent: May 16, 2023

(54) POWER CONVERTER

(71) Applicant: TOSHIBA TEC KABUSHIKI KAISHA, Tokyo (JP)

(72) Inventor: Yoshiaki Hosokawa, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 239 days.

(21) Appl. No.: 16/951,035

(22) Filed: Nov. 18, 2020

(65) Prior Publication Data
US 2021/0296997 A1 Sep. 23, 2021

(30) Foreign Application Priority Data

Mar. 23, 2020 (JP) .............................. JP2020-050538

(51) Int. Cl.
*H02M 3/335* (2006.01)
*B41J 29/00* (2006.01)
*G03G 15/00* (2006.01)

(52) U.S. Cl.
CPC ......... *H02M 3/33523* (2013.01); *B41J 29/00* (2013.01); *G03G 15/80* (2013.01); *G03G 2215/00978* (2013.01)

(58) Field of Classification Search
CPC .... H02M 3/33523; B41J 29/00; G03G 15/80; G03G 2215/00978
See application file for complete search history.

(56) References Cited

U.S. PATENT DOCUMENTS

| | | | | |
|---|---|---|---|---|
| 6,088,244 | A * | 7/2000 | Shioya | H02M 3/33523 323/902 |
| 2007/0025041 | A1* | 2/2007 | Nakayama | H02H 3/24 361/92 |
| 2013/0064566 | A1* | 3/2013 | Kojima | H02M 3/33523 363/21.01 |
| 2013/0111237 | A1* | 5/2013 | Inukai | G03G 15/5004 713/320 |
| 2020/0358363 | A1* | 11/2020 | Hosokawa | H02M 3/01 |
| 2021/0305900 | A1* | 9/2021 | Hosokawa | G03G 15/80 |

FOREIGN PATENT DOCUMENTS

JP 2007-41271 2/2007

* cited by examiner

*Primary Examiner* — Ryan D Walsh
(74) *Attorney, Agent, or Firm* — Amin, Turocy & Watson, LLP

(57) ABSTRACT

According to one embodiment, the power converter includes a power conversion circuit and a power outage detection circuit. The power converter includes a power conversion circuit including an isolation transformer including a primary winding, a secondary winding electromagnetically coupled to the primary winding, and an auxiliary winding, a first DC voltage source which outputs DC power with an input AC power, a switching circuit which switches connection between the first DC voltage source and the primary winding, an auxiliary power supply circuit which supplies the DC power to the switching circuit using a power generated in the auxiliary winding, a second DC voltage source which rectifies and smooths the power generated in the secondary winding and outputs DC power to a load.

15 Claims, 4 Drawing Sheets

POWER CONVERTER

CROSS-REFERENCE TO RELATED APPLICATION

This application is based upon and claims the benefit of priority from Japanese Patent Application No. 2020-050538, filed on Mar. 23, 2020 the entire contents of which are incorporated herein by reference.

FIELD

Exemplary embodiments described herein relate to a power converter.

BACKGROUND

A power converter is generally used to convert power. The power converter supplies power from a primary side to a secondary side via a transformer. The power converter converts AC power into DC power, and switches the DC power using a switching circuit to flow AC currents through the primary side of the transformer. As a result, an induced current is generated on the secondary side of the transformer and power is supplied to a load.

When a momentary power outage occurs in which the input of AC power is temporarily interrupted, the shutdown process may not be performed normally at the load, which may adversely affect the load. Therefore, a power outage detection circuit, which detects a power failure (power outage or momentary power outage) and transmits a power outage detection signal to the load, has been used.

Such a power outage detection circuit includes a photocoupler including a light emitting diode and a phototransistor. The light emitting diode of the photocoupler is connected to the primary side and emits light while AC power is input. In the phototransistor of the photocoupler, the collector and the emitter are electrically connected (turned on) by the light from the light emitting diode. The phototransistor is connected to the secondary side, and configured to be turned off when the light emitting diode is turned off, and, when it is turned off, to transmit a power outage detection signal to the load.

The above configuration has a problem that the light emitting diode of the photocoupler is continuously lit and consumes power during normal operation (steady state) in which the AC power is input.

DETAILED DESCRIPTION

The problem to be solved by the exemplary embodiments is to provide a power converter that detects a power outage.

A power converter according to an exemplary embodiment includes a power conversion circuit and a power outage detection circuit. The power converter includes a power conversion circuit including an isolation transformer including a primary winding, a secondary winding electromagnetically coupled to the primary winding, and an auxiliary winding, a first DC voltage source which outputs DC power with an input AC power, a switching circuit which switches connection between the first DC voltage source and the primary winding, an auxiliary power supply circuit which supplies the DC power to the switching circuit using a power generated in the auxiliary winding, a second DC voltage source which rectifies and smooths the power generated in the secondary winding and outputs DC power to a load. A power outage detection circuit outputs a power outage detection signal to the load in response to a discharge of the power stored in the power conversion circuit when a state in which the AC power is input is changed to a state in which the AC power is not input.

Hereinafter, exemplary embodiments will be described with reference to the drawings.

Figure 1:
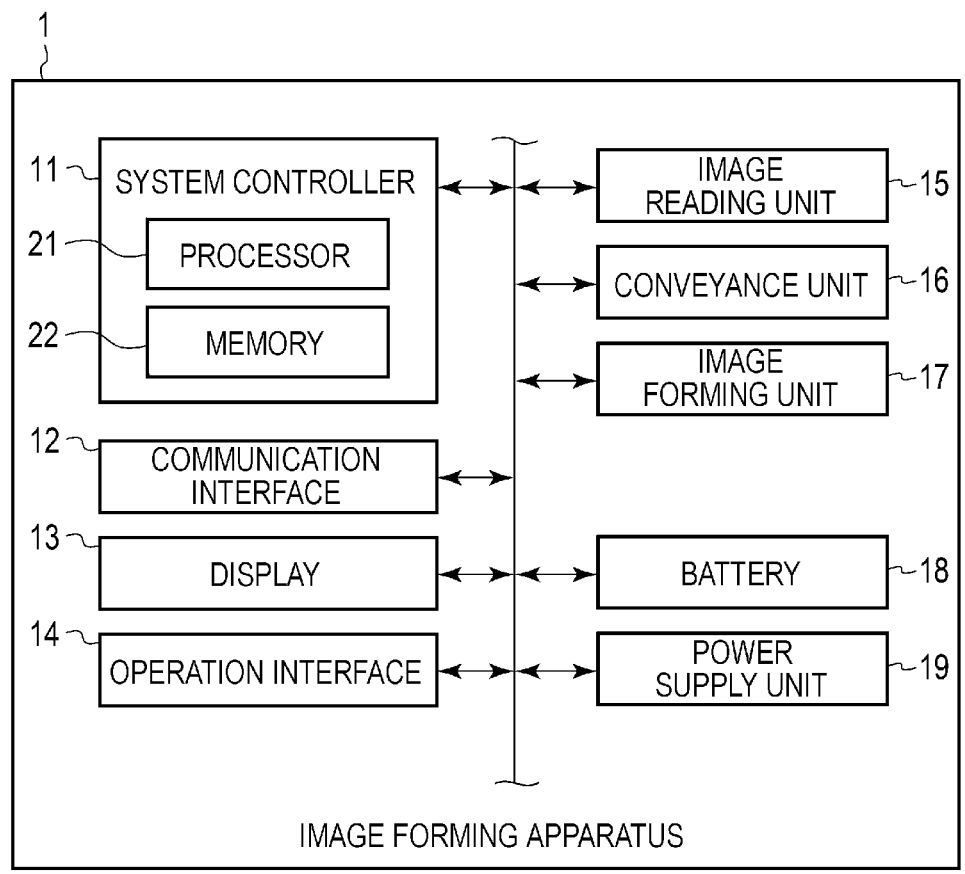
FIG. 1 is a diagram for explaining an exemplary configuration of an image forming apparatus according to an exemplary embodiment.

FIG. 1 is an explanatory diagram of an example of an image forming apparatus 1 according to an exemplary embodiment.

For example, the image forming apparatus 1 is a multi-function printer (MFP) that performs various processes such image forming, and the like, while conveying a recording medium such as a print medium. For example, the image forming apparatus 1 is a solid state scanning type printer (for example, an LED printer) that scans an LED array that performs various processes such as image forming while conveying a recording medium such as a print medium. The image forming apparatus 1 may be an inkjet type printer (inkjet printer) that scans an inkjet head that ejects ink, or another type of printer.

The image forming apparatus 1 forms an electrostatic latent image on a photosensitive drum by charging the photosensitive drum and irradiating the photosensitive drum with light according to image data for printing. The image forming apparatus 1 attaches a toner onto the latent image formed on the photosensitive drum, and transfers the toner attached on the latent image onto a print medium and forms a toner image on the print medium. The image forming apparatus 1 fixes the toner image on the print medium by applying heat and pressure to the print medium on which the toner image is transferred.

The image forming apparatus 1 includes a system controller 11, a communication interface 12, a display 13, an operation interface 14, an image reading unit 15, a conveyance unit 16, an image forming unit 17, a battery 18, and a power supply unit 19. The system controller 11, the communication interface 12, the display 13, the operation interface 14, the image reading unit 15, the conveyance unit 16, the image forming unit 17, the battery 18, and the power supply unit 19 are housed in a casing (not shown).

The system controller 11 controls the image forming apparatus 1. For example, the system controller 11 includes a processor 21 and a memory 22.

The processor 21 is an arithmetic element (for example, CPU) that executes arithmetic process. The processor 21 is the core of the operation of the system controller 11. The processor 21 performs various processes based on data such as programs stored in the memory 22. The processor 21 serves as a control unit capable of executing various operations by executing a program stored in the memory 22.

The memory 22 is a storage device that stores programs and data used in the programs. The memory 22 temporarily stores data or the like being processed by the processor 21. The memory 22 is configured as a non-volatile memory.

The communication interface 12 is an interface for communicating with a client device or the like that supplies a print job via a network.

The display 13 displays a screen in response to a video signal input from the display controller such as the system controller 11 or a graphic controller (not shown). For example, the display 13 displays screens for various settings of the image forming apparatus 1.

The operation interface 14 includes various operating members. The operation interface 14 supplies operation signals corresponding to the operations of the operating members to the system controller 11. For example, the operating members are a touch sensor, a numeric keypad, a power key, a paper feed key, various function keys, a keyboard, or the like. For example, the touch sensor is a resistive film type touch sensor, a capacitive type touch sensor, or the like. The touch sensor acquires information indicating a designated position in a certain area. The touch sensor and the display 13 are integrally configured as a touch panel, and thus inputs a signal indicating the touched position on the screen displayed on the display 13 to the system controller 11.

The image reading unit 15 is configured to read an image from a document. For example, the image reading unit 15 includes a scanner and an automatic document feeder (ADF). The scanner reads the document from a side opposite the glass plate on which the document is arranged. For example, the image reading unit 15 acquires an image of the entire document by acquiring the image with the scanner while moving the scanner. The image reading unit 15 acquires the image of the entire document by acquiring the image with the scanner while passing the document through the reading position of the scanner by the ADF, for example.

The conveyance unit 16 is configured to supply a medium for printing (print medium) to the image forming unit 17 and discharge the print medium on which the image is formed by the image forming unit 17 from the housing. The conveyance unit 16 supplies the print medium from a paper feed cassette (not shown) stored with the print media to the image forming unit 17 one by one. The conveyance unit 16 discharges the print medium on which the image is formed by the image forming unit 17 to a paper discharge tray outside the housing.

The image forming unit 17 forms an image on the print medium based on a control of the system controller 11. The image forming unit 17 includes a process unit, an exposing device, a transfer mechanism, and a fixing device. The image forming unit 17 includes the process unit and the exposing device for each color of toner. For example, the color of the toner is cyan (C), magenta (M), yellow (Y), black (K), and the like. The image forming unit 17 forms a color image on the medium by fixing the toner images in CMYK colors on the medium.

The process unit includes a photosensitive drum, an electrostatic charger, and a developing device.

The photosensitive drum is a photosensitive body including a cylindrical drum and a photosensitive layer formed on an outer peripheral surface of the drum. The photosensitive drum is rotated at a constant speed by a drive mechanism (not shown).

The electrostatic charger uniformly charges the surface of the photosensitive drum. For example, the electrostatic charger uses a charging roller to apply a voltage to the photosensitive drum to charge the photosensitive drum to a uniform negative potential.

The developing device is provided to attach the toner onto the photosensitive drum. The developing device includes a developer container, an agitating mechanism, a developing roller, and a doctor blade.

The developer container is a container that receives and stores the toner sent from a toner cartridge. A carrier is stored in advance in the developer container. The toner sent from the toner cartridge is agitated with the carrier by the agitating mechanism to form a developer in which the toner and the carrier are mixed. The carrier is contained in the developer container when the developing device is manufactured.

The developing roller is rotated in the developer container to attach the developer onto the surface. The doctor blade is a member arranged at a predetermined interval from the surface of the developing roller. The doctor blade removes a portion of the developer adhered onto the surface of the rotating developing roller. As a result, a developer layer having a thickness corresponding to the distance between the doctor blade and the surface of the developing roller is formed on the surface of the developing roller.

The exposing device includes a plurality of light emitting elements. The exposing device irradiates the charged photosensitive drum with light from the light emitting elements to form a latent image on the photosensitive drum. For example, the light emitting element is a light emitting diode (LED) or the like. One light emitting element is configured to irradiate one point on the photosensitive drum with light. The plurality of light emitting elements are arranged in a main scanning direction which is a direction parallel to the rotation axis of the photosensitive drum.

The exposing device irradiates the photosensitive drum with light by the plurality of light emitting elements arranged in the main scanning direction to form a latent image for one line on the photosensitive drum. The exposing device forms a plurality of lines of the latent images by continuously irradiating the rotating photosensitive drum with light.

In the configuration described above, when the surface of the photosensitive drum charged by the electrostatic charger is irradiated with the light from the exposing device, an electrostatic latent image is formed. When the layer of the developer formed on the surface of the developing roller approaches the surface of the photosensitive drum, the toner contained in the developer is adhered onto the latent image formed on the surface of the photosensitive drum. As a result, a toner image is formed on the surface of the photosensitive drum.

The transfer mechanism is configured to transfer the toner image formed on the surface of the photosensitive drum onto the print medium. The transfer mechanism includes a primary transfer belt, a secondary transfer roller, and a plurality of other rollers. The transfer mechanism receives the toner image formed on the surface of the photosensitive drum on an outer peripheral surface of the primary transfer belt. The transfer mechanism conveys the toner image on the outer peripheral surface of the primary transfer belt to a transfer nip between the secondary transfer roller and the outer peripheral surface of the primary transfer belt which are in close contact with each other. The transfer mechanism transfers the toner image on the outer peripheral surface of the primary transfer belt to the print medium by passing the print medium supplied by the conveyance unit 16 through the transfer nip.

The fixing device is configured to fix the toner image transferred onto the print medium into the print medium. The fixing device includes a heating member (heat roller) that applies heat to the print medium, a pressure member (press roller) that applies pressure to the print medium, and a heater that heats the heat roller. The press roller forms a fixing nip between the press roller and the heat roller which are in close contact with each other by applying pressure on the heat roller. The fixing device applies heat and pressure to the print medium by passing the print medium on which the toner image is transferred by the transfer mechanism through the fixing nip. As a result, the fixing device fixes the toner image formed on the print medium. The print medium passed through the fixing nip is discharged to the discharge tray by the conveyance unit 16.

The battery 18 is a DC power source that supplies power for operating the image forming apparatus 1. For example, the battery 18 supplies power to the processor 21 and the memory 22 of the system controller 11, the communication interface 12, and the like.

For example, the battery 18 is configured as a lithium ion secondary battery including an electrode group that includes a stack of a positive electrode and a negative electrode with a separator interposed therebetween. The battery 18 may be configured as a large-capacity capacitor.

The power supply unit 19 is a power converter that converts the input AC power into the DC power in response to the specification of the load and supplies the converted result to the load. The power supply unit 19 supplies power to each component of the image forming apparatus 1, such as the system controller 11, the communication interface 12, the display 13, the operation interface 14, the image reading unit 15, the conveyance unit 16, and the image forming unit 17. The power supply unit 19 supplies DC power to the battery 18 to charge the battery 18.

First Embodiment

Figure 2:
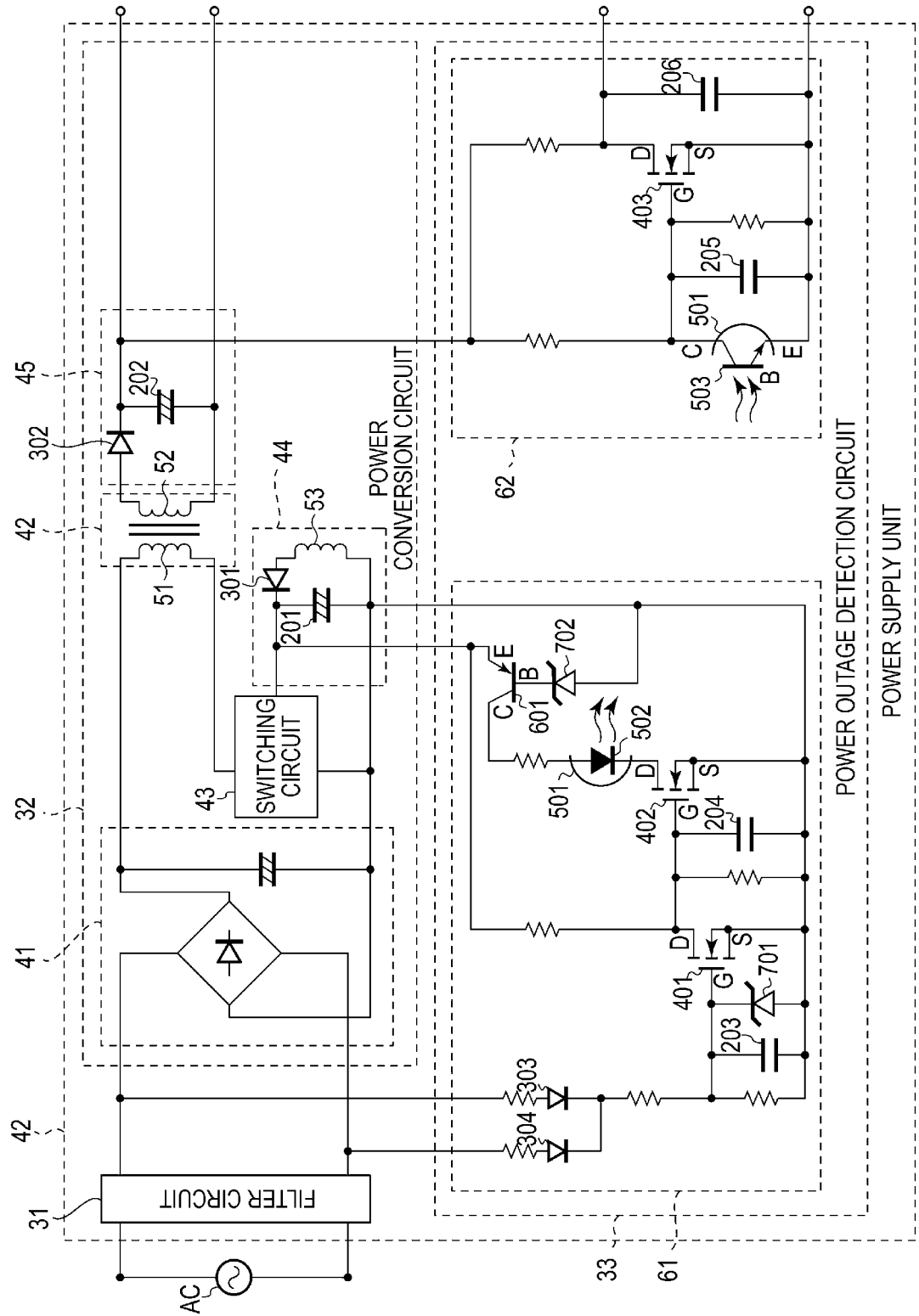
FIG. 2 is a diagram for explaining an exemplary configuration of a power supply unit according to a first embodiment.

FIG. 2 is an explanatory diagram for explaining a configuration of the power supply unit 19. As shown in FIG. 2, the power supply unit 19 includes a filter circuit 31, a power conversion circuit 32, and a power outage detection circuit 33.

The filter circuit 31 is connected between the AC power source (commercial power supply) AC and the power conversion circuit 32. The filter circuit 31 is a noise removal circuit that prevents noise in the power conversion circuit 32 from leaking to the AC power source AC. For example, the filter circuit 31 is an EMC filter. For example, the filter circuit 31 is formed of a capacitor.

The power conversion circuit 32 is a circuit that supplies DC power having an arbitrary voltage value to the load.

The power outage detection circuit 33 detects a power failure (such as a momentary power outage or a power outage) in which AC power from the AC power source AC is interrupted, and supplies a power outage detection signal to the system controller 11, which is a load.

When the system controller 11 receives the power outage detection signal indicating that the power failure is detected, the system controller 11 executes the shutdown process. In the shutdown process, the system controller 11 executes interruption of a running process, data storage, and the like.

Next, the power conversion circuit 32 and the power outage detection circuit 33 will be described in detail.

The power conversion circuit 32 has a primary side to which power is supplied and a secondary side that outputs power. The power conversion circuit 32 includes a rectifying and smoothing circuit 41, an isolation transformer 42, a switching circuit 43, an auxiliary power supply circuit 44, and a power receiving circuit 45. The power conversion circuit 32 includes the rectifying and smoothing circuit 41, the isolation transformer 42, the switching circuit 43, and the auxiliary power supply circuit 44 as a primary side configuration. The power conversion circuit 32 further includes an isolation transformer 42 and a power receiving circuit 45 as a secondary side configuration.

First, the configuration of the primary side of the power conversion circuit 32 will be described.

The rectifying and smoothing circuit 41 performs full-wave rectification on the AC power input from the AC power source AC via the filter circuit 31, smooths the pulsating positive voltage, and supplies the result to the isolation transformer 42 and the switching circuit 43, which are circuits in the subsequent stage. For example, the rectifying and smoothing circuit 41 includes a full-wave rectifying circuit (rectifier) including a plurality of diodes and a smoothing capacitor. That is, the rectifying and smoothing circuit 41 serves as a DC voltage source that supplies a DC voltage to the isolation transformer 42.

The isolation transformer 42 includes a winding 51 on a primary side (primary winding) that generates a magnetic field and a winding 52 on a secondary side (secondary winding) that is insulated from the primary winding 51 and is excited by the magnetic field generated in the primary winding 51. That is, the primary winding 51 and the secondary winding 52 are configured to be electromagnetically coupled.

The switching circuit 43 is a circuit that controls on/off of the current flowing from the smoothing capacitor of the rectifying and smoothing circuit 41 to the primary winding 51 by switching. The switching circuit 43 includes a semiconductor switch and a control circuit.

The semiconductor switch is a semiconductor switch that switches the conduction state based on the control of the control circuit. The semiconductor switch turns on/off the current flowing from the smoothing capacitor to the primary winding 51 based on the control of the control circuit. For example, the semiconductor switch is an n-type channel FET. The drain terminal of the semiconductor switch is connected to the primary winding, a source terminal of the semiconductor switch is connected to a low potential side of the smoothing capacitor, and a gate terminal of the semiconductor switch is connected to the control circuit. The semiconductor switch switches between a conduction state (on state) in which the drain terminal and the source terminal conduct each other, and a non-conduction state (off state) in which the drain terminal and the source terminal do not conduct each other based on a control signal input from the control circuit to the gate terminal.

The control circuit applies a high frequency pulse signal as a control signal to the semiconductor switch. For example, the control circuit applies a pulse signal to the gate terminal of the semiconductor switch. As a result, the control circuit switches the semiconductor switch between the ON state and the OFF state at high speed. As a result, the potential of the smoothing capacitor is supplied to the primary winding 51 of the isolation transformer 42 as a high-frequency pulse, and a magnetic field is generated by the primary winding 51.

As described above, the switching circuit 43 serves as a flyback converter that converts a DC voltage into a high frequency pulse. The switching circuit 43 may be configured as another converter circuit such as a half-bridge converter or a full-bridge converter that supplies the potential of the smoothing capacitor to the primary winding 51 of the isolation transformer 42 as a high-frequency pulse.

The auxiliary power supply circuit 44 supplies a power supply voltage (VCC) for operation to the control circuit of the switching circuit 43. The auxiliary power supply circuit 44 includes an auxiliary winding 53 and a smoothing capacitor 201.

The auxiliary winding 53 is excited by the magnetic field generated in the primary winding 51 of the isolation transformer 42. That is, the auxiliary winding 53 is electromagnetically coupled to the primary winding 51.

The smoothing capacitor 201 is connected in parallel to the auxiliary winding 53. The smoothing capacitor 201 is connected in parallel with the switching circuit 43. That is, the smoothing capacitor 201 stores electric charges by the current generated in the auxiliary winding 53 and supplies the smoothed DC power to the switching circuit 43 connected in parallel.

The auxiliary power supply circuit 44 may include a diode 301 that rectifies the current generated in the auxiliary winding 53. Here, the diode 301 includes an anode connected to the auxiliary winding 53 and a cathode connected to the smoothing capacitor 201.

Next, the configuration of the secondary side of the power conversion circuit 32 will be described.

The power receiving circuit 45 is a circuit that rectifies and smooths the power generated in the secondary winding 52 of the isolation transformer 42 and supplies DC power to the load. The power receiving circuit 45 includes a diode 302 and a smoothing capacitor 202. The output terminal of the power receiving circuit 45 includes the output terminal of the power supply unit 19. For example, the output terminal of the power receiving circuit 45 is connected to the loads, which are various configurations (for example, the conveyance unit 16, the image forming unit 17, the system controller 11, the battery 18, and the like) of the image forming apparatus 1.

The secondary winding 52 of the isolation transformer 42 is excited in response to the magnetic field generated by the primary winding 51, and generates electric power. In the secondary winding 52, a voltage corresponding to the ratio of the numbers of turns of the primary winding 51 and the secondary winding 52 is generated.

The diode 302 includes an anode connected to the secondary winding 52 and a cathode connected to the high potential side of the smoothing capacitor 202. The diode 302 rectifies the current generated in the secondary winding 52 and supplies the result to the smoothing capacitor 202. The diode 302 may be replaced with a MOSFET and a control IC for synchronous rectification. Here, the synchronous rectification may be performed by using the MOSFET.

The smoothing capacitor 202 smooths the positive voltage supplied from the diode 302. The smoothing capacitor 202 supplies a DC voltage to the circuits connected in parallel. Both terminals of the smoothing capacitor 202 form output terminals of the power receiving circuit 45. That is, a load is connected to the smoothing capacitor 202. The smoothing capacitor 202 supplies the smoothed DC voltage to the load. That is, the power receiving circuit 45 serves as a DC voltage source that outputs a DC voltage.

Next, the configuration of the power outage detection circuit 33 will be described. As shown in FIG. 2, a primary side power outage detection circuit 61 and a secondary side power outage detection circuit 62 are provided.

The primary side power outage detection circuit 61 includes semiconductor switches 401 and 402, a transistor 601, diodes 303 and 304, Zener diodes 701 and 702, capacitors 203 and 204, and a light emitting diode 502 of a photocoupler 501.

The semiconductor switches 401 and 402 are n-channel FETs, respectively. The semiconductor switches 401 and 402 may be configured as npn type transistors, for example.

The gate terminal of the semiconductor switch 401 is connected to the output terminal of the filter circuit 31. Specifically, the gate terminal of the semiconductor switch 401 is connected to the cathode of the diode 303 of which anode is connected to one of the output terminals of the filter circuit 31. The gate terminal of the semiconductor switch 401 is connected to the cathode of the diode 304 of which anode is connected to the other output terminal of the filter circuit 31.

The drain terminal of the semiconductor switch 401 is connected to the terminal on the high potential side of the smoothing capacitor 201 of the auxiliary power supply circuit 44 of the power conversion circuit 32.

The source terminal of the semiconductor switch 401 is connected to the terminal on the low potential side of the smoothing capacitor 201 of the auxiliary power supply circuit 44 of the power conversion circuit 32.

The Zener diode 701 includes an anode connected to the source terminal of the semiconductor switch 401 and a cathode connected to the gate terminal of the semiconductor switch 401.

The capacitor 203 is connected between the source terminal and the gate terminal of the semiconductor switch 401.

The gate terminal of the semiconductor switch 402 is connected to the drain terminal of the semiconductor switch 401 and the terminal on the high potential side of the smoothing capacitor 201 of the auxiliary power supply circuit 44 of the power conversion circuit 32.

The drain terminal of the semiconductor switch 402 is connected to the cathode of the light emitting diode 502 of the photocoupler 501.

The source terminal of the semiconductor switch 402 is connected to the terminal on the low potential side of the smoothing capacitor 201 of the auxiliary power supply circuit 44 of the power conversion circuit 32.

The capacitor 204 is connected between the source terminal and the gate terminal of the semiconductor switch 402.

For example, the transistor 601 is a pnp type transistor. The transistor 601 may be configured as a p-channel FET.

The base terminal of the transistor 601 is connected to the cathode of the Zener diode 702 of which anode is connected to the terminal on the low potential side of the smoothing capacitor 201 of the auxiliary power supply circuit 44 of the power conversion circuit 32.

The emitter terminal of the transistor 601 is connected to the terminal on the high potential side of the smoothing capacitor 201 of the auxiliary power supply circuit 44 of the power conversion circuit 32.

The collector terminal of the transistor 601 is connected to the anode of the light emitting diode 502 of the photocoupler 501.

The secondary side power outage detection circuit 62 includes a semiconductor switch 403, a capacitor 205, a capacitor 206, and a phototransistor 503 of the photocoupler 501.

The semiconductor switch 403 is an n-channel type FET. The semiconductor switch 403 may be configured as an npn type transistor, for example.

The gate terminal of the semiconductor switch 403 is connected to the terminal on the high potential side of the smoothing capacitor 202 of the power receiving circuit 45 of the power conversion circuit 32.

The drain terminal of the semiconductor switch 403 is connected to the gate terminal of the semiconductor switch 403 via a resistor and forms one of the output terminals of the power outage detection circuit 33.

The source terminal of the semiconductor switch 403 forms another output terminal of the power outage detection circuit 33.

The capacitor 205 is connected between the source terminal and the gate terminal of the semiconductor switch 403.

The capacitor 206 is connected between the drain terminal and the source terminal of the semiconductor switch 403. That is, the capacitor 206 is connected between the pair of output terminals of the power outage detection circuit 33.

The collector terminal of the phototransistor 503 of the photocoupler 501 is connected to the gate terminal of the semiconductor switch 403.

The emitter terminal of the phototransistor 503 of the photocoupler 501 is connected to the source terminal of the semiconductor switch 403.

The photocoupler 501 includes the light emitting diode 502 and the phototransistor 503. In the photocoupler 501, current flows from the anode of the light emitting diode 502 to the cathode. In the photocoupler 501, when the light emitting diode 502 emits light, light falls incident on the photo transistor 503, so that the collector terminal and the emitter terminal of the phototransistor 503 are electrically conducted.

Next, the operation of the power outage detection circuit 33 will be described.

Figure 3:
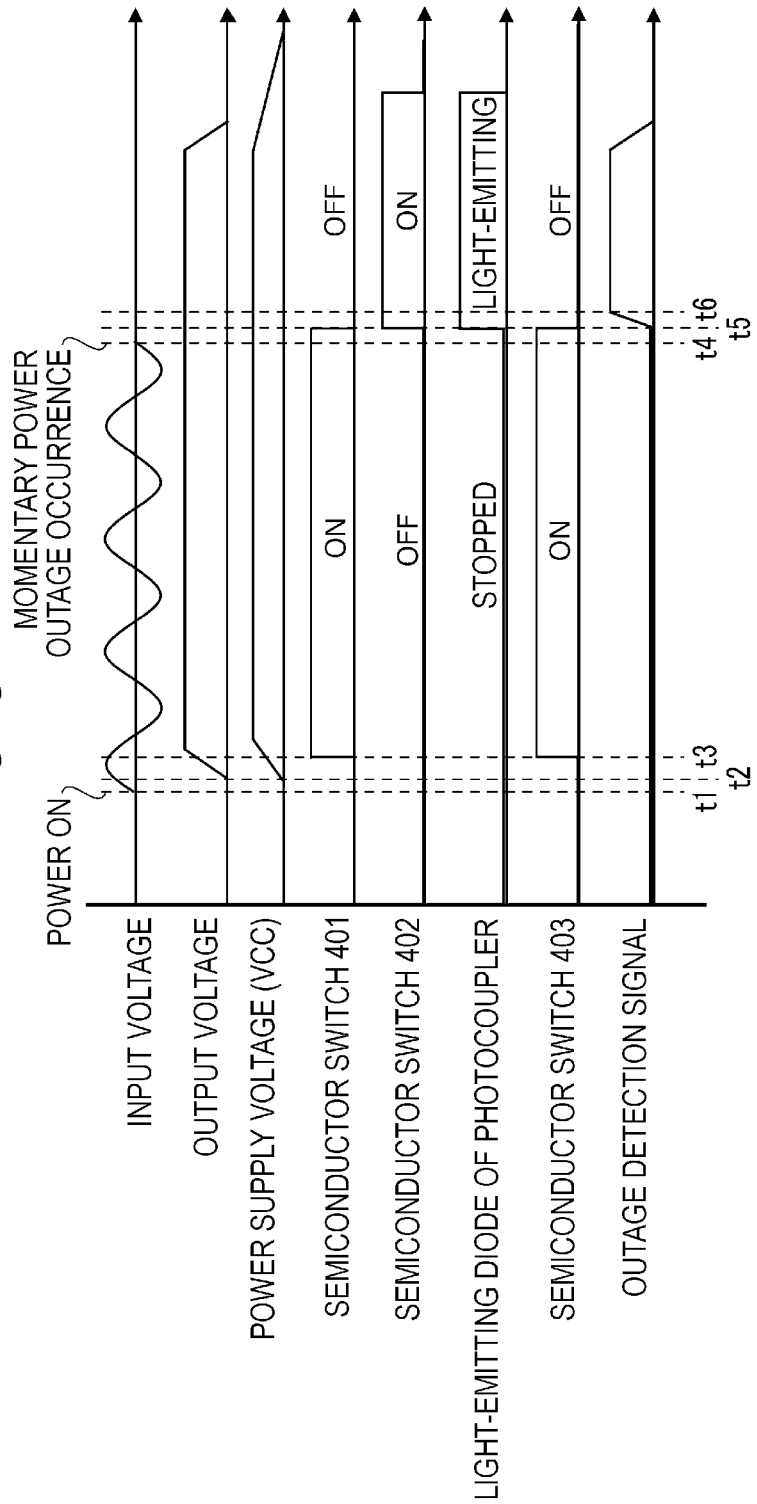
FIG. 3 is a diagram for explaining an exemplary operation of the power supply unit according to the first embodiment.

FIG. 3 shows a timing chart for explaining the operation of the power outage detection circuit 33. The horizontal axis of FIG. 3 represents time. The vertical axis of FIG. 3 represents the input voltage, the output voltage (voltage of the smoothing capacitor 202), the power supply voltage VCC (output voltage of the auxiliary power supply circuit 44), ON/OFF signal of the semiconductor switches 401 and 402, light emission state of the light emitting diode of the photocoupler, ON/OFF signal of the semiconductor switch 403, and a power outage detection signal, respectively.

First, the operation at the time of starting and the normal operation will be described.

It is assumed that the power supply of the image forming apparatus 1 is turned on at timing t1 in FIG. 3 and the supply of the AC power from the AC power source AC to the power supply unit 19 of the image forming apparatus 1 is started. Here, the power conversion circuit 32 performs a normal operation in which there is no power failure such as a momentary power outage or a power outage.

When the power source of the image forming apparatus 1 is turned on, the supply of the alternating current to the primary winding 51 by the switching circuit 43 is started, and the output voltage (that is, the voltage of the smoothing capacitor 202) gradually increases from timing t2. The output voltage becomes a constant value when sufficient electric charges are stored in the smoothing capacitor 202 of the power receiving circuit 45.

When the supply of the alternating current to the primary winding 51 by the switching circuit 43 is started, an induced current is generated in the auxiliary winding 53. Electric charges are stored in the smoothing capacitor 201 by the current generated in the auxiliary winding 53, and the power supply voltage VCC (that is, the voltage of the smoothing capacitor 201) output from the auxiliary power supply circuit 44 gradually increases from timing t2. The power supply voltage VCC becomes a constant value determined by the winding ratio between the primary winding 51 and the auxiliary winding 53 when sufficient electric charges are stored in the smoothing capacitor 201 of the auxiliary power supply circuit 44.

When the power conversion circuit 32 is operated normally, that is, when there is no power failure such as a momentary power outage or the power outage, the pulsating current is input to the primary side power outage detection circuit 61 of the power outage detection circuit 33 via the diode 303 and the diode 304.

The capacitor 203 of the primary side power outage detection circuit 61 stores electric charges by the input pulsating current. It is assumed that the voltage of the capacitor 203 is equal to or greater than the Zener voltage of the Zener diode 701 at the timing t3. Here, a current flows from the cathode of the Zener diode 701 to the anode thereof due to the voltage of the capacitor 203, and a potential difference corresponding to the voltage of the capacitor 203 is applied between the gate terminal and the source terminal of the semiconductor switch 401. Accordingly, the semiconductor switch 401 is turned on.

When the semiconductor switch 401 is turned on, since the gate terminal and the source terminal of the semiconductor switch 402 are short-circuited, there is no potential difference between the gate terminal and the source terminal of the semiconductor switch 402. Accordingly, the semiconductor switch 402 is turned off.

When the semiconductor switch 402 is turned off, no current flows in the light emitting diode 502 of the photocoupler 501, and the light emitting diode 502 does not emit light. Accordingly, in the secondary side power outage detection circuit 62 of the power outage detection circuit 33, the phototransistor 503 of the photocoupler 501 is turned off.

On the secondary side, when the voltage of the smoothing capacitor 202 of the power receiving circuit 45 gradually increases, power is supplied from the smoothing capacitor 202 to the secondary side power outage detection circuit 62. The capacitor 205 stores the electric charges by the current from the smoothing capacitor 202.

When the electric charges are stored in the capacitor 205 and the phototransistor 503 of the photocoupler 501 is turned off, a potential difference according to the voltage of the capacitor 205 is generated between the gate terminal and the source terminal of the semiconductor switch 403 of the secondary side power outage detection circuit 62. Accordingly, the semiconductor switch 403 is turned on.

When the semiconductor switch 403 is turned on, the pair of output terminals of the power outage detection circuit 33 are short-circuited. As a result, the power outage detection signal output from the pair of output terminals of the power outage detection circuit 33 is the GND level.

That is, when the power conversion circuit 32 is operated normally, the semiconductor switch 401 is turned on, and the semiconductor switch 402 is turned off, and thus the light emitting diode 502 of the photocoupler 501 does not emit light, and the phototransistor 503 of the photocoupler 501 is turned off, and the semiconductor switch 403 is turned on, and thus the power outage detection signal is the GND level.

The transistor 601 is turned off while the voltage of the smoothing capacitor 201 of the auxiliary power supply circuit 44 is less than the Zener voltage of the Zener diode 702 of the primary side power outage detection circuit 61 at the time of starting from the timing t2 to t3. When the voltage of the smoothing capacitor 201 is equal to or greater than the Zener voltage of the Zener diode 702, the transistor 601 is turned on. As described above, the transistor 601 and the Zener diode 702 may prevent the semiconductor switch 402 from being turned on, and the light emitting diode 502 of the photocoupler 501 from lighting, by the voltage of the smoothing capacitor 201 at the timing before the semiconductor switch 401 is turned on at the time of starting. The Zener voltage of the Zener diode 702 is set to a value less than the voltage of the smoothing capacitor 201 during normal operation.

Next, the operation when a power failure occurs will be described.

At timing t4 in FIG. 3, in the power supply unit 19 of the image forming apparatus 1, it is assumed that the AC power source AC has a power failure (a momentary power outage, a power outage, or the like).

When the supply of the AC power from the AC power source AC is interrupted, the electric charges remaining in the power conversion circuit 32 starts to be discharged. Accordingly, the output voltage of the power conversion circuit 32 and the power supply voltage VCC from the auxiliary power supply circuit 44 are gradually reduced after being maintained for a certain time.

When the supply of the AC power from the AC power source AC is interrupted, the pulsating current is not input to the primary side power outage detection circuit 61 of the power outage detection circuit 33 via the diode 303 and the diode 304. As a result, no charge is supplied to the capacitor 203 of the primary side power outage detection circuit 61, and the voltage of the capacitor 203 is decreased.

When the voltage of the capacitor 203 is less than the Zener voltage of the Zener diode 701, there is no potential difference between the gate terminal and the source terminal of the semiconductor switch 401, and thus the semiconductor switch 401 is turned off. It is assumed that the timing at which the semiconductor switch 401 is turned off is timing t5. Note that the capacitor 203 is configured such that the voltage level thereof is decreased at least earlier than the smoothing capacitor 201 of the auxiliary power supply circuit 44.

When the semiconductor switch 401 is turned off, the voltage of the capacitor 204 causes a potential difference between the gate terminal and the source terminal of the semiconductor switch 402, and the semiconductor switch 402 is turned on at timing t5.

When the semiconductor switch 402 is turned on and the voltage of the smoothing capacitor 201 of the auxiliary power supply circuit 44 is equal to or greater than the Zener voltage of the Zener diode 702, the transistor 601 is turned on.

As a result, a current flows from the terminal on the high potential side of the smoothing capacitor 201 of the auxiliary power supply circuit 44 to the transistor 601, the light emitting diode 502 of the photocoupler 501, the semiconductor switch 402, and the terminal on the low potential side of the smoothing capacitor 201, in order. As a result, the light emitting diode 502 of the photocoupler 501 emits light at timing t5. Accordingly, in the secondary side power outage detection circuit 62 of the power outage detection circuit 33, the phototransistor 503 of the photocoupler 501 is turned on.

When the voltage of the smoothing capacitor 201 is gradually decreased, the light emitting diode 502 of the photocoupler 501 stops emitting light. It is because the voltage of the smoothing capacitor 201 is decreased and the semiconductor switch 402 may not be maintained in the ON state, or the voltage of the smoothing capacitor 201 is less than the Zener voltage of the Zener diode 702 and the transistor 601 may not be maintained in the ON state.

That is, in the primary-side power outage detection circuit 61, when the supply of the AC power from the AC power source AC is interrupted, the light emitting diode 502 of the photocoupler 501 is caused to emit light by the electric power stored in the power conversion circuit 32 while the AC power is being supplied from the AC power source AC.

When the phototransistor 503 of the photocoupler 501 is turned on at the secondary side, the gate terminal and the source terminal of the semiconductor switch 403 of the secondary side power outage detection circuit 62 are short-circuited. As a result, there is no potential difference between the gate terminal and the source terminal of the semiconductor switch 403, and thus the semiconductor switch 403 is turned off.

When the semiconductor switch 403 is turned off, electric charges are stored in the capacitor 206 connected in parallel to the pair of output terminals of the power outage detection circuit 33 by the current discharged from the smoothing capacitor 202 of the power receiving circuit 45. As a result, from timing t6, the capacitor 206 is in a state of outputting a predetermined voltage (H level) as a power outage detection signal from the pair of output terminals of the power outage detection circuit 33.

That is, when the supply of the AC power from the AC power source AC is interrupted, the semiconductor switch 401 is turned off, and the semiconductor switch 402 is turned on, and thus the light emitting diode 502 of the photocoupler 501 emits light, and the phototransistor 503 of the photocoupler 501 is turned on, and the semiconductor switch 403 is turned off, and thus the power outage detection signal is the H level according to the voltage of the capacitor 206.

The processor 21 of the system controller 11 continuously executes the normal operation when the power outage detection signal is the GND level. When the power outage detection signal is the H level indicating that the power failure is detected, the processor 21 executes the shutdown process.

As described above, the power supply unit 19 includes the power conversion circuit 32 and the power outage detection circuit 33. The power conversion circuit 32 includes the isolation transformer 42, the first DC voltage source (rectifying and smoothing circuit 41), the switching circuit 43, the auxiliary power supply circuit 44, and the second DC voltage source (power receiving circuit 45). The isolation transformer 42 includes the primary winding 51, the secondary winding 52 electromagnetically coupled to the primary winding 51, and the auxiliary winding 53. The rectifying and smoothing circuit 41 outputs DC power with the input AC power. The switching circuit 43 switches the connection between the rectifying and smoothing circuit 41 and the primary winding 51. The auxiliary power supply circuit 44 supplies DC power to the switching circuit 43 with the electric power generated in the auxiliary winding 53. The power receiving circuit 45 rectifies and smooths the power generated in the secondary winding 52 and outputs DC power to the load.

The power outage detection circuit 33 outputs a power outage detection signal to the load in response to the discharge of the power stored in the power conversion circuit 32 when a state in which the AC power is input is changed to a state in which the AC power is not input. As a result, when a momentary power outage occurs in which the input of AC power is temporarily interrupted, transmitting the power outage detection signal to the load may cause the load to be normally shut down. Since the power outage detection circuit 33 is configured to output the power outage detection signal to the load in response to the discharge from the power conversion circuit 32, the power outage detection signal may be output while saving power.

The power outage detection circuit 33 includes the photocoupler 501 including the light emitting diode 502 connected at such a position that it is not conducted during normal operation and conducted with the auxiliary power supply circuit 44 when a state in which the AC power is input is changed to a state in which the AC power is not input. The power outage detection circuit 33 is configured to switch the level of the power outage detection signal between the GND level and the H level according to the ON/OFF state of the phototransistor 503 of the photocoupler 501. That is, the light emitting diode 502 of the photocoupler 501 of the power outage detection circuit 33 is configured not to be lit during normal operation, and to be lit due to discharge from the auxiliary power supply circuit 44 of the power conversion circuit 32 that occurs when the state in which AC power is input is changed to the state in which AC power is not input. As a result, the power outage detection circuit 33 may save power.

In the above embodiment, it is described that the anode of the light emitting diode 502 of the photocoupler 501 is connected to the high potential side of the capacitor (the smoothing capacitor 201) charged by the auxiliary winding 53 via the transistor 601, but it is not limited to such configuration. The light emitting diode 502 may be provided at any position as long as it serves as a path through which a current flows when the semiconductor switch 402 is turned on.

In the above embodiment, it is described that the power outage detection circuit 33 is connected to the diodes 303 and 304 to draw the AC power from the output terminal of the filter circuit 31, but it is not limited to such a configuration. The power outage detection circuit 33 may be configured to draw the AC power from any position as long as it is a place where the voltage is changed at least depending on supply or discontinuation of supply of the AC power.

Second Embodiment

Figure 4:
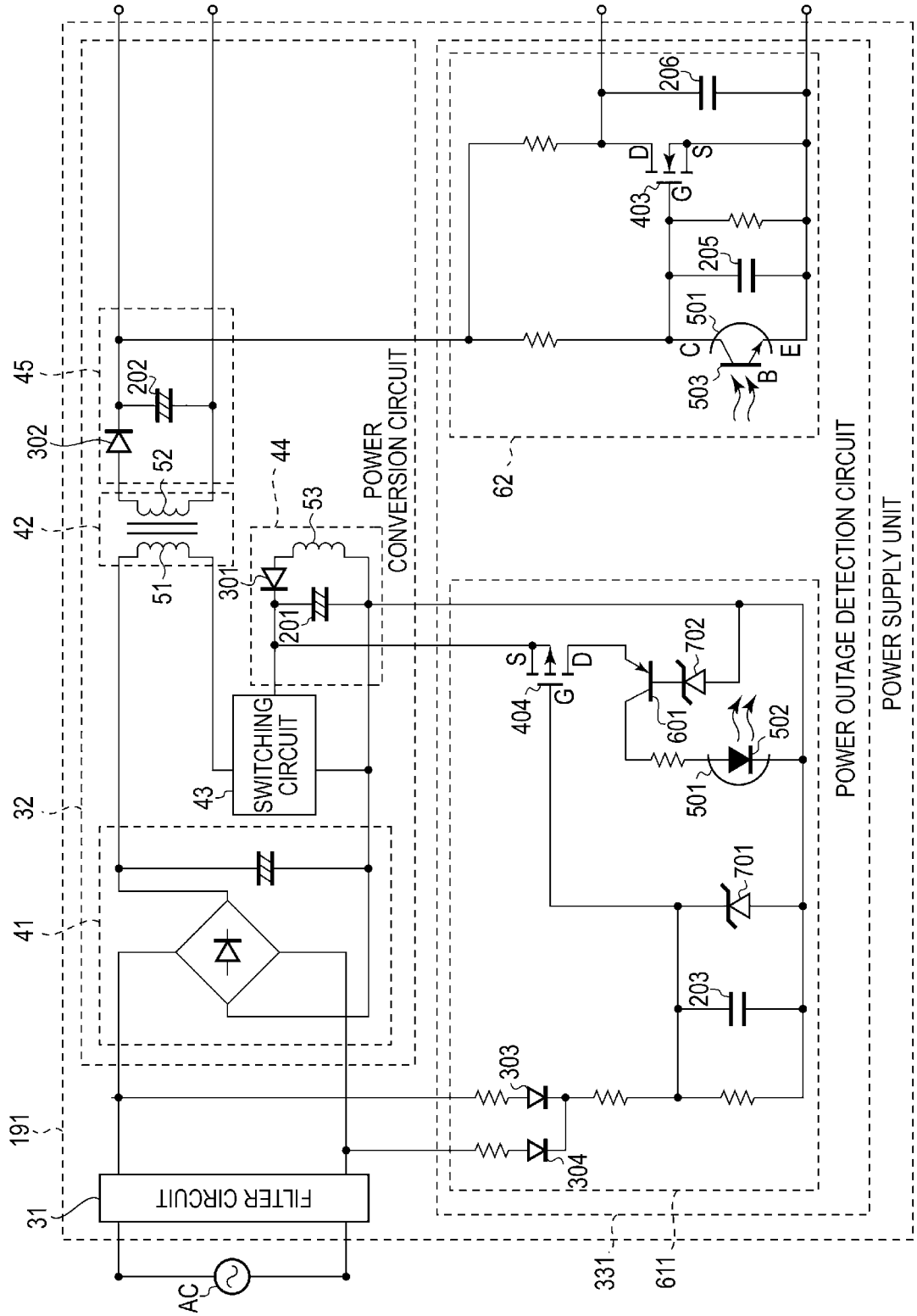
FIG. 4 is a diagram for explaining an exemplary configuration of a power supply unit according to a second embodiment.

FIG. 4 is an explanatory diagram for explaining a configuration of the power supply unit 191 according to a second embodiment. Note that the same components as those in the first embodiment are denoted by the same reference numerals, and detailed description thereof is omitted.

As shown in FIG. 4, the power supply unit 191 includes the filter circuit 31, the power conversion circuit 32, and a power outage detection circuit 331. The power outage detection circuit 331 includes a primary side power outage detection circuit 611 and the secondary side power outage detection circuit 62. That is, the power supply unit 191 according to the second embodiment is different from the power outage detection circuit 33 of the first embodiment in view of the configuration of the primary side power outage detection circuit 611.

The primary side power outage detection circuit 611 includes a semiconductor switch 404, the transistor 601, the diodes 303 and 304, the Zener diodes 701 and 702, the capacitor 203, and the light emitting diode 502 of the photocoupler 501.

The semiconductor switch 404 is a p-channel FET. The semiconductor switch 404 may be configured as a pnp type transistor, for example.

The gate terminal of the semiconductor switch 404 is connected to the output terminal of the filter circuit 31. Specifically, the gate terminal of the semiconductor switch 404 is connected to the cathode of the diode 303 of which anode is connected to one of the output terminals of the filter circuit 31. The gate terminal of the semiconductor switch 404 is connected to the cathode of the diode 304 of which anode is connected to the other output terminal of the filter circuit 31.

The source terminal of the semiconductor switch 404 is connected to the terminal on the high potential side of the smoothing capacitor 201 of the auxiliary power supply circuit 44 of the power conversion circuit 32.

The drain terminal of the semiconductor switch 401 is connected to the emitter terminal of the transistor 601.

The Zener diode 701 includes an anode connected to the terminal on the low potential side of the smoothing capacitor 201 of the auxiliary power supply circuit 44 of the power conversion circuit 32 and the cathode of the light emitting diode 502 of the photocoupler 501. The Zener diode 701 includes a cathode connected to the gate terminal of the semiconductor switch 404.

The capacitor 203 is connected in parallel to the Zener diode 701. That is, the capacitor 203 is connected to the terminal on the low potential side of the smoothing capacitor 201 of the auxiliary power supply circuit 44 of the power conversion circuit 32, the anode of the light emitting diode 502 of the photocoupler 501, and the gate terminal of the semiconductor switch 404.

The base terminal of the transistor 601 is connected to the cathode of the Zener diode 702 of which anode is connected to the terminal on the low potential side of the smoothing capacitor 201 of the auxiliary power supply circuit 44 of the power conversion circuit 32.

The emitter terminal of the transistor 601 is connected to the drain terminal of the semiconductor switch 404.

The collector terminal of the transistor 601 is connected to the anode of the light emitting diode 502 of the photocoupler 501.

Next, the operation of the power outage detection circuit 331 will be described.

It is assumed that the power supply of the image forming apparatus 1 is turned on, and the supply of the AC power from the AC power source AC to the power supply unit 19 of the image forming apparatus 1 is started. Here, a pulsating current is input to the primary side power outage detection circuit 611 described above via the diodes 303 and 304.

The capacitor 203 of the primary side power outage detection circuit 611 stores electric charges by the input pulsating current. The capacitor 203 is configured such that its potential is greater than the smoothing capacitor 201 of the auxiliary power supply circuit 44 when the electric charges are sufficiently stored.

When the voltage of the capacitor 203 is equal to or greater than the Zener voltage of the Zener diode 701, the voltage of the capacitor 203 causes a current to flow from the cathode of the Zener diode 701 to the anode.

The potential of the gate terminal of the semiconductor switch 404 is equal to the potential of the terminal on the high potential side of the capacitor 203. It is assumed that the potential of the gate terminal of the semiconductor switch 404 is Vg.

The potential of the source terminal of the semiconductor switch 404 is equal to the potential on the high potential side of the smoothing capacitor 201 of the auxiliary power supply circuit 44 (that is, the power supply voltage Vcc).

The semiconductor switch 404 is turned off when the potential of the gate terminal is greater than the potential of the source terminal, and is turned on when the potential of the gate terminal is less than the potential of the source terminal.

Accordingly, in the primary side power outage detection circuit 611, during normal operation, Vg>Vcc, and the semiconductor switch 404 is turned off. Accordingly, the smoothing capacitor 201 and the light emitting diode 502 are not conducted, and the light emitting diode 502 is not lit.

Note that the transistor 601 is turned off while the voltage of the smoothing capacitor 201 is less than the Zener voltage of the Zener diode 702 of the primary side power outage detection circuit 611 as in the first embodiment. Accordingly, the transistor 601 and the Zener diode 702 may prevent the light emitting diode 502 from being turned on by the voltage of the smoothing capacitor 201 at the timing before the semiconductor switch 404 is turned on at the time of starting.

Next, the operation when a power failure occurs will be described. In the power supply unit 19 of the image forming apparatus 1, it is assumed that the AC power source AC has a power failure (a momentary power outage, the power outage, or the like).

When the supply of the AC power from the AC power source AC is interrupted, the electric charges remaining in the power conversion circuit 32 start to be discharged. Accordingly, the output voltage of the power conversion circuit 32 and the power supply voltage VCC from the auxiliary power supply circuit 44 are gradually reduced after being maintained for a certain time.

When the supply of the AC power from the AC power source AC is interrupted, the pulsating current is not input to the primary side power outage detection circuit 611 of the power outage detection circuit 331 via the diode 303 and the diode 304. Accordingly, no charge is supplied to the capacitor 203 of the primary side power outage detection circuit 611, and the voltage of the capacitor 203 is decreased. As a result, when the potential Vg of the gate terminal of the semiconductor switch 404<the potential Vcc of the source terminal thereof, the semiconductor switch 404 is turned on.

When the semiconductor switch 404 is turned on and the voltage of the smoothing capacitor 201 of the auxiliary power supply circuit 44 is equal to or greater than the Zener voltage of the Zener diode 702, the transistor 601 is turned on. When the semiconductor switch 404 is turned on, the voltage of the smoothing capacitor 201 of the auxiliary power supply circuit 44 is applied to the emitter terminal of the transistor 601. When the voltage of the smoothing capacitor 201 of the auxiliary power supply circuit 44 is equal to or greater than the Zener voltage of the Zener diode 702, the transistor 601 is turned on. That is, the semiconductor switch 404 opens the light emitting diode 502 and the auxiliary power supply circuit 44 while the AC power is input, and causes the light emitting diode 503 and the auxiliary power supply circuit 44 to be conducted when a state in which the AC power is input is changed to a state in which the AC power is not input.

As a result, a current flows from the terminal on the high potential side of the smoothing capacitor 201 of the auxiliary power supply circuit 44 to the semiconductor switch 404, the transistor 601, the light emitting diode 502 of the photocoupler 501, and the terminal on the low potential side of the smoothing capacitor 201, in order. As a result, the light emitting diode 502 of the photocoupler 501 emits light. Accordingly, in the secondary side power outage detection circuit 62 of the power outage detection circuit 331, the phototransistor 503 of the photocoupler 501 is turned on.

When the voltage of the smoothing capacitor 201 is gradually decreased, the light emitting diode 502 of the photocoupler 501 stops emitting light. It is because the voltage of the smoothing capacitor 201 is decreased and the semiconductor switch 402 may not be maintained in the ON state, or the voltage of the smoothing capacitor 201 is less than the Zener voltage of the Zener diode 702 and the transistor 601 may not be maintained in the ON state.

That is, in the primary-side power outage detection circuit 611, when the supply of the AC power from the AC power source AC is interrupted, the light emitting diode 502 of the photocoupler 501 is caused to emit light by the electric power stored in the power conversion circuit 32 while the AC power is being supplied from the AC power source AC.

As described above, the power outage detection circuit 331 of the second embodiment includes a smaller number of semiconductor switches of the primary side power outage detection circuit 611 than the number of semiconductor switches of the power outage detection circuit 33 of the first embodiment. As a result, the number of components of the power outage detection circuit may be reduced, while achieving the same effect as that of the first embodiment.

In the above embodiment, it is described that the power supply unit 19 is assumed to be incorporated in the image forming apparatus 1, but it is not limited to such a configuration. The power supply unit 19 may be incorporated in any device such as a product registration device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power converter, comprising:
   a power conversion circuit comprising an isolation transformer including a primary winding, a secondary winding electromagnetically coupled to the primary winding, and an auxiliary winding, a first DC voltage source which outputs DC power with an input AC power, a switching circuit which switches connection between the first DC voltage source and the primary winding, an auxiliary power supply circuit which supplies the DC power to the switching circuit using a power generated in the auxiliary winding, a second DC voltage source which rectifies and smooths the power generated in the secondary winding and outputs DC power to a load; and
   a power outage detection circuit which outputs a power outage detection signal to the load in response to a discharge of the power stored in the power conversion circuit when a state in which the AC power is input is changed to a state in which the AC power is not input,
   wherein the power outage detection circuit comprises a photocoupler with a light emitting diode connected thereto at such a position so as not to conduct during normal operation but conducted with the auxiliary power supply circuit when the state in which the AC power is input is changed to the state in which the AC power is not input, and switches a level of the power outage detection signal between a GND level and an H level in response to ON/OFF of a phototransistor of the photocoupler.

2. The power converter according to claim 1, wherein the power outage detection circuit comprises:
a first semiconductor switch which is turned on while the AC power is input; and
a second semiconductor switch which causes the light emitting diode and the auxiliary power supply circuit to be conducted when the first semiconductor switch is turned off.

3. The power converter according to claim 2, wherein the power outage detection circuit further comprises a third semiconductor switch and a Zener diode, and
the third semiconductor switch is connected in series with the light emitting diode, and is turned on when output voltage of the auxiliary power supply circuit is equal to or greater than Zener voltage of the Zener diode.

4. The power converter according to claim 1, wherein the power outage detection circuit comprises a third semiconductor switch which opens the light emitting diode and the auxiliary power supply circuit while the AC power is input, and causes the light emitting diode and the auxiliary power supply circuit to be conducted when the state in which the AC power is input is changed to the state in which the AC power is not input.

5. A power conversion method, comprising:
outputting DC power from a first DC voltage source with an input AC power;
switching a connection between the first DC voltage source and a primary winding;
supplying the DC power to a switching circuit using a power generated in an auxiliary winding;
rectifying and smoothing the power generated in a secondary winding and outputting DC power to a load; and
outputting a power outage detection signal from a power outage detection circuit to the load in response to a discharge of the power stored in a power conversion circuit comprising an isolation transformer including the primary winding, the secondary winding electromagnetically coupled to the primary winding, and the auxiliary winding when a state in which the AC power is input is changed to a state in which the AC power is not input,
wherein the power outage detection circuit comprises a photocoupler with a light emitting diode connected thereto at such a position so as not to conduct during normal operation but conducted with the auxiliary power supply circuit when the state in which the AC power is input is changed to the state in which the AC power is not input, further comprising:
switching a level of the power outage detection signal between a GND level and an H level in response to ON/OFF of a phototransistor of the photocoupler.

6. The power conversion method according to claim 5, wherein the power outage detection circuit comprises:
a first semiconductor switch which is turned on while the AC power is input; the power conversion method further comprising:
causing the light emitting diode and the auxiliary power supply circuit to be conducted when the first semiconductor switch is turned off.

7. The power conversion method according to claim 6, wherein the power outage detection circuit further comprises a second semiconductor switch and a Zener diode, further comprising:
the second semiconductor switch is connected in series with the light emitting diode and turning on the second semiconductor switch when output voltage of the auxiliary power supply circuit is equal to or greater than Zener voltage of the Zener diode.

8. The power conversion method according to claim 5,
wherein the power outage detection circuit comprises a semiconductor switch which opens the light emitting diode and the auxiliary power supply circuit while the AC power is input, the power conversion method further comprising:
causing the light emitting diode and the auxiliary power supply circuit to be conducted when the state in which the AC power is input is changed to the state in which the AC power is not input.

9. An image forming apparatus, comprising:
an image forming component; and
a power converter coupled to the image forming component, comprising:
a power conversion circuit comprising an isolation transformer including a primary winding, a secondary winding electromagnetically coupled to the primary winding, and an auxiliary winding, a first DC voltage source which outputs DC power with an input AC power, a switching circuit which switches connection between the first DC voltage source and the primary winding, an auxiliary power supply circuit which supplies the DC power to the switching circuit using a power generated in the auxiliary winding, a second DC voltage source which rectifies and smooths the power generated in the secondary winding and outputs DC power to a load; and
a power outage detection circuit which outputs a power outage detection signal to the load in response to a discharge of the power stored in the power conversion circuit when a state in which the AC power is input is changed to a state in which the AC power is not input,
wherein the power outage detection circuit comprises a photocoupler with a light emitting diode connected thereto at such a position so as not to conduct during normal operation but conducted with the auxiliary power supply circuit when the state in which the AC power is input is changed to the state in which the AC power is not input, and switches a level of the power outage detection signal between a GND level and an H level in response to ON/OFF of a phototransistor of the photocoupler.

10. The image forming apparatus according to claim 9, wherein the power outage detection circuit comprises:
a first semiconductor switch which is turned on while the AC power is input; and
a second semiconductor switch which causes the light emitting diode and the auxiliary power supply circuit to be conducted when the first semiconductor switch is turned off.

11. The image forming apparatus according to claim 10, wherein the power outage detection circuit further comprises a third semiconductor switch and a Zener diode, and
the third semiconductor switch is connected in series with the light emitting diode, and is turned on when output voltage of the auxiliary power supply circuit is equal to or greater than Zener voltage of the Zener diode.

12. The image forming apparatus according to claim 9, wherein the power outage detection circuit comprises a semiconductor switch which opens the light emitting diode and the auxiliary power supply circuit while the AC power is input, and causes the light emitting diode and the auxiliary power supply circuit to be conducted when the state in which the AC power is input is changed to the state in which the AC power is not input.

13. The image forming apparatus according to claim 9, wherein the image forming apparatus is a scanning type printer.

14. The image forming apparatus according to claim 9, wherein the image forming apparatus is an inkjet printer.

15. The image forming apparatus according to claim 9, wherein the image forming apparatus is a multifunction peripheral.

* * * * *